(12) United States Patent
Legrand

(10) Patent No.: US 6,347,491 B1
(45) Date of Patent: Feb. 19, 2002

(54) SEPARABLE FASTENER SYSTEM, A METHOD OF ASSEMBLY, AND AN ASSEMBLY ASSEMBLED THEREBY

(75) Inventor: Denis Legrand, Wargnies le Grand (FR)

(73) Assignee: PPG Industries Glass S.A., Puteaux (FR)

(*) Notice: Subject to any disclaimer, the term of this patent is extended or adjusted under 35 U.S.C. 154(b) by 0 days.

(21) Appl. No.: 09/010,964

(22) Filed: Jan. 22, 1998

(30) Foreign Application Priority Data

Jan. 23, 1997 (FR) .............................. 97 00668

(51) Int. Cl.⁷ .............................................. E06B 3/964
(52) U.S. Cl. ................ 52/204.62; 52/208; 52/204.591; 52/204.5; 52/204.597; 296/201
(58) Field of Search ........................... 52/208, 204.597, 52/204.62; 296/96.21, 201

(56) References Cited

U.S. PATENT DOCUMENTS

| | | | |
|---|---|---|---|
| 2,367,657 A | 1/1945 | Boersma | 189/36 |
| 4,487,448 A | 12/1984 | Griffin | 296/146 |
| 5,475,956 A * | 12/1995 | Agrawal et al. | 52/208 |

FOREIGN PATENT DOCUMENTS

| | | | |
|---|---|---|---|
| DE | 3336856 A1 | 10/1983 | |
| EP | 214459 | 10/1988 | ........... F16B/13/04 |
| EP | 2691759 | 5/1992 | ........... F16B/5/12 |
| EP | 593909 | 9/1993 | ........... F16B/5/12 |
| EP | 629785 | 12/1994 | ........... F16B/5/02 |
| FR | 2593445 | 1/1986 | ........... B60R/13/06 |
| GB | 803296 | * 10/1958 | |

* cited by examiner

*Primary Examiner*—Carl D. Friedman
*Assistant Examiner*—Patrick J. Chavez
(74) *Attorney, Agent, or Firm*—Nawrocki, Rooney & Sivertson, P.A.

(57) ABSTRACT

The invention relates in particular to a separable fastener system for fixing together an element, e.g. a vehicle window, and at least one other member, such as a brake light. The system includes an intermediate structure such as a gasket made of elastically deformable material; intermediate fixing means; a positioning surface; and a stud with an expansion space around the stud, and an orifice associated with a housing for holding captive a shank without injuring the orifice.

11 Claims, 1 Drawing Sheet

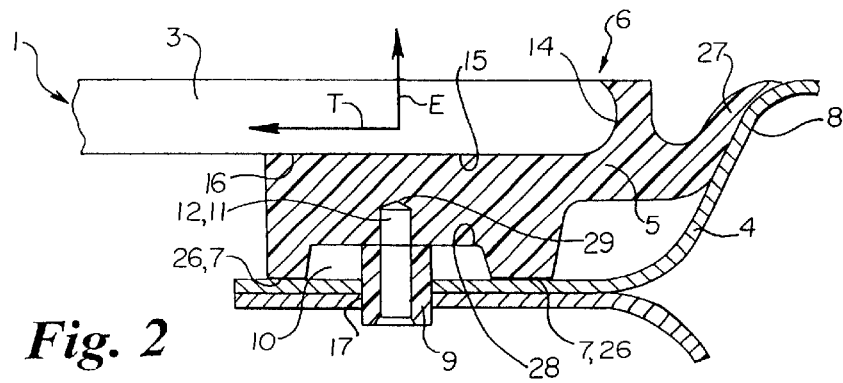
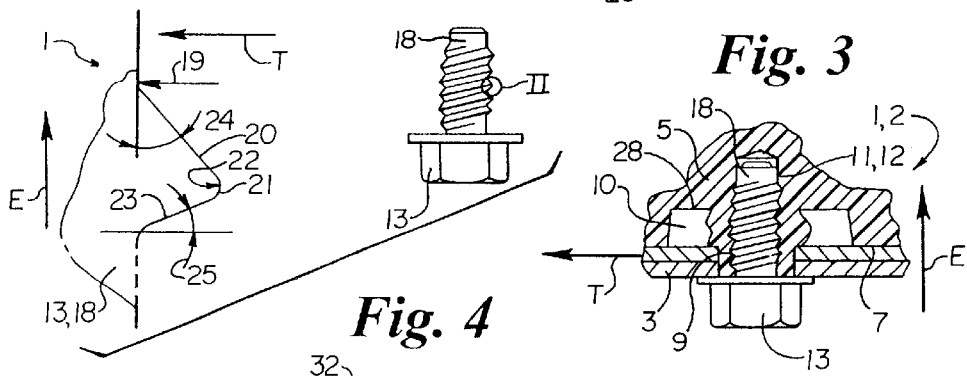
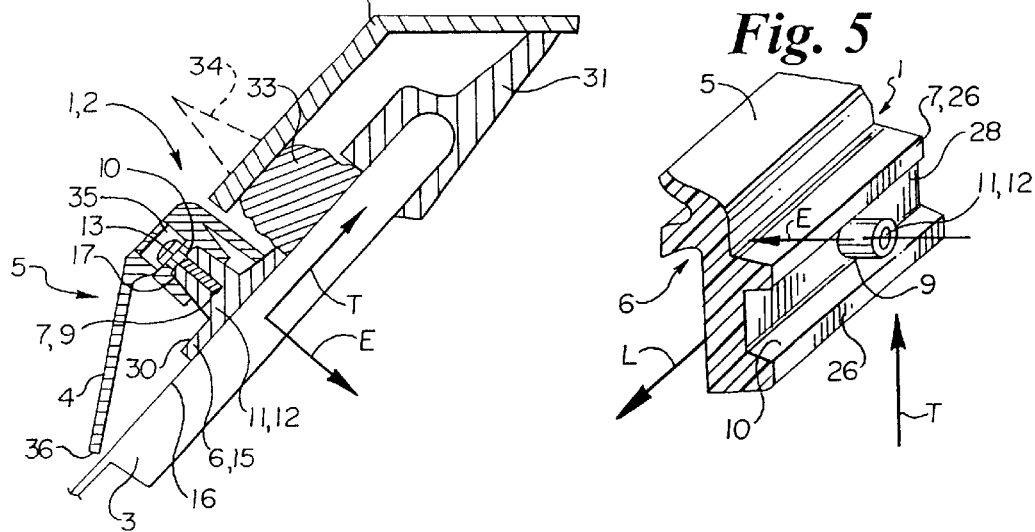

SEPARABLE FASTENER SYSTEM, A METHOD OF ASSEMBLY, AND AN ASSEMBLY ASSEMBLED THEREBY

FIELD OF THE INVENTION

The invention relates to a separable fastener system, an assembly method, and an assembly assembled thereby.

The technical field of the invention is that of assembling together an element, e.g. a vehicle window, and at least one other member, such as an accessory, by means of an intermediate structure such as a sealing gasket, or the like.

BACKGROUND OF THE INVENTION

Numerous techniques exist for this purpose.

Document U.S. Pat. No. 2,367,657 describes hooking means for fixing a dashboard or a bumper to a car.

A rubber member is vulcanized on a metal sheet. Fasteners such as nuts and bolts are considered as being bulky, lengthy to install, and not stable.

In some cases, the length of a stud is slightly greater than the distance between a shoulder formed by a stud head and a flat, so that when forced into position, a compressed state is obtained.

Document GB-A-803 296 describes a releasable fastener such as a press stud, having a receptacle and a stud both of non-metallic material, for clothing.

Document DE-A-33 36856 describes a fixing element for vehicle upholstery, having two plastic portions that are elastically clipped together through an opening in the fixed portion, orifices being provided for a bolt.

Document DE-U-85 07 143 is cited as also relating to this technical field.

Document EP-A-214 459 describes a system for fixing building elements of plastics material on a thin support.

Document FR-A-2 593 445 describes a section member for fastening to the bodywork of a vehicle by resilient clipping, the section member having a longitudinally open tubular core of hard plastics material coextruded with a sealing gasket of soft plastics material, the cavity of the core being closed by a membrane that is likewise made of soft plastics material.

Document FR-A-2 691 759 describes a fixing system for fixing pieces to the structure of a motor vehicle, the system being implemented by directly molding a material that may reach 95 on the Shore hardness scale and may reach a bending modulus of 75 MPa.

A linking stud carrying the piece is provided with a recess constituted, going from the outside towards the inside, by an enlarged first portion outside towards the inside, by an enlarged first portion for putting the fixing member into place and forming locking means against rotation.

A cylindrical second portion forms a retaining duct for the fastener member. This second portion is advantageously tapped.

It opens out into a third portion formed by a an undercut snap-fastening chamber. The end wall of the chamber constitutes a material reserve and a screwing reserve for fixing members that are longer than the recess.

The connection between the stud and the member does not have any degree of freedom.

Document EP-A-593 909 describes a plastics fastener for a car.

It is provided with resilient fixing elements for securing the fastener in a receiving orifice in a portion of a metal sheet, in such a manner as to allow relative linear displacement to take place.

Because of the displacement, manufacturing tolerances can be compensated.

Known techniques suffer from drawbacks.

The main drawbacks are described in the particular example of overmolded window panels of the kind assembled to vehicle bodywork elements, e.g. in a car.

One technique consists in sticking the other member to the structure.

Means must be provided for holding the window in the fixing position while the adhesive is setting, e.g. by polymerizing. Such holding means are sophisticated and expensive. That slows down vehicle assembly.

Generally, the adhesives used make working conditions difficult and/or are unacceptable for the environment. In particular, harmful vapors are given off by the adhesives used.

Fixing obtained by adhesive is not separable. As a result, removing the window, whether when making a repair or at the end of the lifetime of the vehicle, for recycling purposes, is both difficult and not very effective.

On a window, the area on which the adhesive adheres needs to be masked by an opaque strip. This reduces the field of view through the window, and is often unsightly.

It is also common practice to provide fixing by means of screws that are secured to the bodywork and that are also engaged in tapped nuts or inserts, themselves secured to the gasket of the window.

As with adhesive, this requires means to be placed in the mold, and such means are likewise sophisticated and expensive.

In addition, a nut used as an insert gives rise to a risk of the entire molding being discarded, particularly as a result of damage that occurs when closing the mold.

Often, an unacceptable amount of space needs to be provided for receiving such inserts, in particular in the thickness direction perpendicular to the window.

Such inserts increase costs and make logistics more complicated, particularly because of the need to package and ship additional pieces.

OBJECTS AND SUMMARY OF THE INVENTION

The invention seeks to solve these drawbacks, in particular.

It makes it possible to limit the number of pieces required for fixing purposes, to make them more compact, and to simplify the logistics that need to be provided.

By means of the invention, it is possible to obtain fixing that is reliable, with limited risks for the environment, while making assembly both separable and easy, e.g. for ultimate recycling.

To this end, the invention provides, in a first aspect, a separable fastener system for assembling an element, e.g. a vehicle window, to at least one other member, such as a vehicle accessory or a bodywork frame, via an intermediate structure, e.g. a sealing gasket, or the like.

Consideration is given mainly to two applications of the invention.

Either assembly requires the element to be fastened to the other member, as is the case for a window being fastened to vehicle bodywork.

Or else the other member is fastened to the element, as is the case of an accessory, e.g. a brake light fastened to a vehicle window.

The system comprises in combination:

a structure of elastically deformable material;

intermediate fixing means for fixing the structure securely to the element, for example a shape that is complementary to the shape of a corresponding portion of the element;

at least one positioning and/or sealing surface on the structure for placing against the said other member;

at least one stud on the structure flush with and/or projecting from the positioning surface, close to said surface and/or including said surface; the stud being designed to be engaged with clearance in a recess of the said other member;

at least one expansion space formed around the stud; and at least one orifice in the stud extending in an insertion direction and provided with a cylindrical housing of substantially circular cross-section ad extending substantially rectilinearly along the insertion direction.

The housing is designed to hold captive in the structure the shank of a separate fastener means such as a screw or the like, that shank having a rounded chamfer thread of cross-section at its root that is substantially equal to or greater than that of the housing when in a ready position, i.e. when at rest before insertion of the shank.

As a result, the stud is suitable for having the shank inserted therein and for being subjected to predetermined outwards elastic deformation or swelling into the expansion space without injuring the orifice of the housing, and for being pressed outwards against the inside of the recess.

According to a characteristic, the intermediate structure is made of an elastically deformable material such as rubber, polyurethane known as "PU", or a polymer, in particular the ethylene and propylene terpolymer known as "EDPM".

By way of example, the material used may have hardness on the Shore D scale of the order of 50 to 85, and a Young's modulus of the order of 250 MPa.

The intermediate structure may constitute a single block, for example, in particular a block that is molded directly on the element.

According to another characteristic, the intermediate fixing means include at least one bearing plane designed to be placed against (and optionally glued to) a face of the element and/or a concave shape designed to receive (flush) a complementary convex edge surface of the element. For example, these intermediate means may be integrally molded with the intermediate structure.

According to yet another characteristic, the structure includes at least one positioning surface such as a bearing strip designed to be substantially parallel to a face of the said other member and/or a sealing surface such as an elastically deformable lip designed to be placed against the said other member.

In an embodiment, the intermediate structure is provided with at least one stud whose free end is flush with a positioning surface, and includes such a surface.

For example, the orifice of the stud opens out in the insertion direction, at least in a positioning surface and/or the expansion space is defined exclusively by the outline of the stud, perpendicular to the insertion direction.

In another embodiment, the intermediate structure is provided with at least one stud projecting from a positioning surface, in the vicinity thereof, and is at least locally separated therefrom perpendicularly to the insertion direction by the expansion space.

For example, the outline of the stud may be designed to swell into a ring shape, thereby forming a positioning surface portion by surrounding and/or providing sealing between an end wall of the expansion space and the recess in the said other member.

According to a characteristic, the expansion space includes an end wall that is substantially perpendicular to the insertion direction.

For example, at least one stud of the intermediate structure is frustoconical in shape, of cross-section that is larger in area close to the end wall of the expansion space than where the orifice opens out at its end that is opposite in the insertion direction.

The frustoconical shape may possible be designed to allow its flare angle to increase during predetermined outward elastic swelling.

According to another characteristic, at least one orifice is provided with a rectilinear cylindrical longitudinal housing that is substantially parallel to the insertion direction. For example, the housing need not have any undercut.

In an embodiment, the orifice includes an end gap or opening to enable a shank of separate fastener means to have its free end when in a clamping position at a distance in the insertion direction from an end wall or opening.

According to yet another characteristic, the system includes separate fastener means such as screws or the like, each having a threaded shank designed to be held captive, in the insertion direction, in a housing of the structure.

The diameter at the root of the thread on the shank is substantially equal to or greater than the inside diameter of the housing when in a ready position, i.e. before the shank is inserted.

The shank may be made of synthetic material or of metal. Such a shank differs from a "self-tapping" shank since a self-tapping shank injures its assembly housing, and therefore weakens it.

The thread has a rounded chamfered profile, and for example in section parallel to the insertion direction, and going from its insertion free end to its opposite end, may comprise:

a straight leading edge of the thread that slopes outwards substantially at 45°;

a rounded junction between edges having a radius that is about 0.2 times to 0.3 times the diameter at the root of the thread, and in particular about 0.25 times the diameter, and/or that is greater than 2 mm or 3 mm; and a straight retaining edge of the thread, that slopes inwards substantially at 15° to a transverse plane.

In a second aspect, the invention provides a method of assembling together an element such as a vehicle window and at least one other member such as an accessory or a bodywork frame, via an intermediate structure, e.g. a sealing gasket provided with at least one separable fastener system as mentioned above.

The invention comprises in particular, the following combination of steps:

inserting a shank of separate fastener means in an insertion direction into a stud housing, using force and screwing motion;

subjecting the stud under the effect of the insertion force solely to a predetermined amount of elastic swelling, without injuring it;

locking the stud under the effect of the swelling into the expansion space bearing outwards against the inside of a recess in the other member; and optionally subjecting a frustoconical shape of the stud to an increase in its flare angle during the predetermined outward elastic swelling.

When the orifice includes an end gap or opening, the shank of the separate fastener means, when in its final clamping position, has its free end at a distance in the insertion direction from an end wall or an opening.

According to a characteristic, the outline of the stud is swollen into a ring, thereby forming a portion of a positioning surface that acts by clamping and/or sealing between an end wall of the expansion space and the recess in the other member.

In a third aspect, the invention provides an assembly assembled using at least one fastener system and/or assembly method as defined above.

In an embodiment, the assembly comprises at least: an element, e.g. an element that is flat in the insertion direction, such as a window; a gasket or the like at the periphery of the element, e.g. a sealing gasket including at least one separable fastener system; and one other member such as a vehicle bodywork frame.

In an embodiment, the assembled assembly comprises at least: one other member, e.g. an accessory such as a brake light; an element such as a window, e.g. a motor vehicle back window; and an intermediate structure fixed at a distance, perpendicular to the insertion direction from the edges of the element.

BRIEF DESCRIPTION OF THE DRAWING

The invention is described in detail below with reference to the accompanying drawing, showing embodiments. In the drawing:

FIG. 1 is a fragmentary view in section on the elevation-transverse plane through a system and an assembly constituting an embodiment of the invention, shown in an intermediate position during assembly;

FIG. 2 is a fragmentary view on a larger scale of a detail II of FIG. 1, showing the separate fastener means, and their thread in the form of a rounded chamfer;

FIG. 3 is a view similar to FIG. 1 showing the system in the final assembled position;

FIG. 4 is a view similar to FIG. 1 showing another embodiment of the invention in the final assembled position; and FIG. 5 is a fragmentary perspective view partially in section on the elevation-transverse plane of a sealing gasket including a fastener system of the invention.

MORE DETAILED DESCRIPTION

In the figures, three mutually orthogonal directions L, E, and T are shown.

The direction L is referred to as "longitudinal", the direction T as "transverse", and the direction E as the "elevation" direction.

The invention is described herein with reference to these directions L, E, and T.

The components of the invention are described in their positions and orientations of ordinary use. However, they can naturally take up various positions or orientations.

This applies in particular to components that are deformable or movable.

Similarly, the positions and orientations of the components of the invention can be different during storage.

These positions and orientations are therefore given purely for explanatory purposes.

It is specified at this point that the terms "bottom" and "top" are considered in the elevation direction E respectively as indicating a low position and a high position.

The same goes for the terms "inside" and "outside".

The terms "elevation", "longitudinally" and "transversely" relate to the corresponding directions.

In the description below, the terms "elevation" and "insertion" are both used relative to the direction E.

Overall reference 1 designates a separable fastener system.

Overall reference 2 designates an assembled assembly.

The system 1 is designed to assemble together an element 3 and at least one other member 4 that is secured thereto via an intermediate structure 5.

The assembly 2 thus comprises the element 3, the other member 4, and the intermediate structure 5, in particular.

The fastener system 1 mainly comprises:
  the structure 5 which is made of an elastically deformable material;
  intermediate fixing means 6 of the structure 5;
  at least one positioning surface 7 and/or sealing surface 8 on the structure 5;
  at least one stud 9 of the structure 5;
  at least one expansion space 10 formed around the stud 9;
  at least one orifice 11 in the stud 9, extending along the insertion direction E, and provided with a cylindrical housing 12; and
  separate fastener means 14 such as screws or the like.

The fixing means 6 are designed to secure the element 3 rigidly to the intermediate structure.

Depending on circumstances, the element 3 acts as a support, as in FIG. 4, or it itself supported.

This applies to the example of FIGS. 1 to 3, and to the example of FIG. 5 which relates thereto. This is the embodiment that is described first.

Naturally, the same references designate components in the various embodiments that are identical or similar.

The first embodiment of the invention enables the element 3, in this case a vehicle window, to be assembled with one other member 4, in this case a bodywork frame, via the intermediate structure 5, in this case a sealing gasket.

The intermediate fixing means 6 of the structure 5 are designed to secure the structure rigidly to the element 3 with retention being provided by the element 3 and the structure 5 having corresponding portions that are of complementary shapes.

Generally, this intermediate fixing is performed prior to assembly, i.e. prior to fastening using the system 1.

In FIG. 1, the structure or gasket 5 may be overmolded on the window that constitutes the element 3.

In this example, the gasket 5 has a shaped concave surface 14 flush with the peripheral edge surface of the window 3 which is complementary convex shape.

A substantially plane "bearing plane" surface 15 of the gasket 5 forms a portion of the intermediate fixing means 6. The surface 15 is complementary to an inside face of the window 3, and more particularly to its longitudinal and transverse peripheral margin.

Fixing is provided by placing a layer of primer 16 on this internal peripheral margin, e.g. by silkscreen printing or the like. Then, when the gasket 5 is being overmolded, the gasket material reacts with the primer layer and gives rise to the intermediate fixing and activates the adhesive.

In embodiments that are not shown, the gasket 5 is overmolded directly on the window 3. Alternatively, when fixing is being performed, it can be mounted thereon by mechanical means 6, e.g. by being stretched around it, or by adding adhesive.

In FIG. 5, as in FIG. 4, the intermediate structure is a single piece.

This intermediate structure or gasket 5 is made of an elastically deformable material such as rubber, polyurethane known as "PU", or a polymer, in particular the terpolymer of ethylene and propylene known as "EPDM".

In this example, the hardness of the material on the Shore D scale is about 50 to 85, and its Young's modulus is about 250 MPa.

In FIGS. 1, 3, and 5, the stud 9 of the structure 5 projects from the positioning surface 7 in the direction E.

The stud 9 is mounted with clearance in a recess 17 of the other member 4, in an intermediate assembly position (FIG. 1).

FIG. 5 shows clearly that the expansion space 10 is provided around the stud 9 in the directions L and T.

The housing 12 is cylindrical, of circular cross-section perpendicular to the insertion direction E and it is rectilinear in the longitudinal direction.

The housing 12 serves to hold captive a shank 18 of separate fastener means 13, in this case a screw.

FIG. 2 shows that the shank 18 has a thread of a rounded chamfer shape. The cross-section 19 at the root of the thread is substantially equal to or greater than the cross-section of the housing in a ready position, i.e. at rest before the shank 18 is inserted.

When the shank 18 is inserted, the housing 12 is subjected to a predetermined amount of outward elastic deformation, but without injuring the orifice.

This deformation holds captive the screw of the means 13 without weakening the structure 5, and in particular without weakening it by making cuts.

The shank 18 to be held captive in the housing 12 of the structure 5 in the insertion direction E, and more generally the screw of the means 13, is made of synthetic material or is made of metal. Such a shank 18 differs from a "self-tapping" shank which injures its housing on assembly, thereby weakening it.

FIG. 2 shows in detail the profile of the rounded chamfer thread, in section parallel to the insertion direction E. Going from its free insertion end towards its opposite end, in this case a hexagonal head 13, the profile presents:

a leading straight edge 20 of the thread that slopes outwards substantially at 45°;

a rounded junction 21 between edges, having a radius 22 of the order of 0.2 times to 0.3 times the diameter at the root of the thread, and in particular about 0.25 times said diameter, being greater than 2 mm or 3 mm; and a retaining straight edge 23 of the thread sloping inwards substantially at 15° to the transverse plane.

The angle between the direction E and the leading edge 20 is referenced 24, whereas that between the retaining edge 23 and a transverse plane, i.e. a plane perpendicular to the direction E and parallel to the direction T and the direction L, is referenced 25.

The head 13 of the screw is designed to be clamped against the member 4.

In FIGS. 1 and 5, the intermediate structure 5 has two positioning surfaces 7, constituted by bearing strips 26 designed to be substantially parallel to an outside face of the other member 4.

A sealing surface 27, in this case an elastically deformable lip, is designed to bear against said member 4.

The surfaces 7 extend substantially perpendicularly to the direction E, along the periphery of the window 3 and thus locally following the directions L and T, in particular.

In this case, the orifice 12 opens out in the insertion direction E at a distance from the strips 26, and the expansion space 10 is defined exclusively by the outline of the stud 9, perpendicularly to the insertion direction E. This space 10 thus surrounds the stud 9.

In FIGS. 1, 3, and 5, the expansion space 10 comprises an end wall 28 extending substantially perpendicularly to the insertion direction E.

When the stud 9 is frustoconical in shape, the cross-section having the largest area is closer to the end wall 28 of the expansion space than is its opposite end in the insertion direction, where the orifice 11 opens out.

It is explained below that this frustoconical shape is designed to increase its flare angle during the predetermined outward elastic swelling.

It is emphasized that the housing 12 in this case is rectilinear in the longitudinal direction substantially parallel to the insertion direction E and does not have any undercutting.

In addition, the orifice 11 has a gap at its end wall 29 so that when the shank 18 of the fastener means 13 is in the clamping position, as shown in FIGS. 3 and 4, the free end of the shank remains at a distance from the end wall 29 in the insertion direction E.

Other embodiments, not shown, provide for the orifice 11 to open out in the surface 15 facing the element 3.

The embodiment of FIG. 4 makes it possible to assemble a "third stop light" or brake light on a back window constituting the element 3, with the light constituting the above-mentioned "other" member 4.

In this case, the intermediate structure 5 has a single positioning and sealing surface 7 defined by the frustoconical outline of the stud 9.

In the example shown, the structure 5 and the gasket 31 are obtained by being simultaneously injected into the same mold in which the window 3 is enclosed.

Naturally, the structure 5 and the gasket 31 could be obtained separately.

Relative to the direction E, the angle of the surface 7 going from the element 3 towards the outer free end of the stud is of the order of 5° to 10°.

In this case, the stud 9 is flush with the positioning surface 7 and includes said surface. In addition, the member 4 bears in the direction E against a surface 30 from which the stud 9 projects.

The stud 9 is designed to be mounted with clearance in a recess 17 of the member 4, which recess is similar in shape but of slightly larger section when at rest.

In this case, the intermediate structure 5 constitutes a one-piece peg fixed on the element 3 by the means 6.

The peg or structure 5 has a bearing plane 15 placed against a face of the element 3, with an interposed layer 16.

In the second embodiment of FIG. 4, the peg 5 is provided with at least one stud 9 whose free end extends perpendicularly to the direction E.

In section parallel to the direction E, the peg 5 is generally in the form of an upside-down T-shape.

The stud 9 forms the upright of the T-shape. While the cross bar of the T is defined by the surface 30 towards the outside and by its bearing face 15 towards the inside.

The orifice 11 of the stud 9 opens out in the insertion direction E at said free end.

In the assembly position, the expansion space 10 is defined by the outline of the stud 9 perpendicularly to the insertion direction E, and by the free end of the stud 9 and also by the end wall of the recess 17 likewise extending perpendicularly to the direction E.

In this case, the recess 17 forms a tapering hollow socket with a hole through its end wall for the screw shank 18 of the separate fastener means 13.

This recess 17 is integral with the translucent cover of rigid region formed by the member 4 in FIG. 4.

Remote from the recess 17 in the direction E, the shank passage opens out into a cavity 35 for receiving and hiding the means 13, in particular the screw head, which has a cruciform driving socket.

The window 3 has a peripheral gasket 31 and is rigidly fixed to a bodywork frame 32, by a fillet of adhesive 33.

The initial shape of the fillet 33, before the window 3 is fixed to the farmer 32, is shown in dashed lines and is given the reference 34.

Alternatively, the gasket 31 is provided with fastener systems 1 for assembling the window 3 to the frame 32.

A peripheral rim 36 of the member 4 is either designed to press locally against the inside face of the window 3, and against the surface 30 in substantially sealed manner.

Or else, clearance is left between the window 3 and the cover 4, as shown.

The assembly method is described below.

It is assumed that the structure 5 and the element 3 are rigidly fixed together by the means 6.

The fixed-together element 3 and structure 5 are brought up to the member 4 along the direction E until the intermediate assembly position is reached (FIG. 1).

At this point, each stud 9 is disposed in a corresponding recess 17 of the member 4, while the surfaces 7 are placed against appropriate portions of the member 4.

Certain surfaces, such as the lip 27, are subjected to primary sealing deformation in this position.

Then, initially, the free end of the shank 18 of a screw means 13 is applied to the open outside end of each orifice 11 in the direction E only.

Subsequently, the method comprises the following combination of steps:

a shank 18 of the separate fastener means 13 is inserted in the insertion direction E into the housing 12, using force and screwing motion;

the stud 9 under the effect of the insertion force is subjected solely to predetermined elastic swelling without injuring the housing 12;

under the effect of the swelling into the expansion space 10, the stud 9 is pressed outwards against the inside of the recess; and where appropriate the flare angle of the frustoconical shape of the stud 9 is subjected to an increase during the predetermined outward elastic swelling.

The orifice 11 has a gap next to its end wall 29 so in the final clamping position the shank 18 of the fastener means 13 has its free end at a distance from the end wall of the orifice 11 in the insertion direction E.

FIG. 3 shows that the outline of the stud 9 is subjected to swelling into the form of a ring, thereby forming a portion of the positioning surface 7 by clamping and secondary sealing, between the end wall of the expansion space 10 and the recess 17.

An assembled assembly 2 is thus obtained using at least one fastener system 1.

It should be observed that the swelling into the space 10 also avoids undesirable "squeaking" within an assembly.

What is claimed is:

1. A separable fastener system for assembling an element and at least one other member via an intermediate structure, the system comprising in combination:

a structure of elastically deformable material;

intermediate fixing means carried by the structure for fixing the structure securely to the element;

at least one positioning surface on the structure for engaging the said other member;

a stud formed integrally with the structure at the positioning surface; the stud designed to be inserted through an aperture in the said other member;

an expansion space formed around the stud; and an orifice in the stud extending in an insertion direction through a cylindrical housing of the stud of substantially circular cross-section and extending substantially rectilinearly along the insertion direction;

the housing being designed to capture a shank of a separate fastener means, the shank having a rounded chamfer thread of a diameter that is at least as great as that of the housing; wherein the stud is adapted to have the shank inserted therein and be subjected to predetermined outwards elastic deformation into the expansion space without destroying the orifice.

2. A system according to claim 1, wherein the structure is made of an elastically deformable material selected from a group including rubber, polyurethane, and a polymer, wherein the structure is a single piece molded directly onto the element.

3. A system according to claim 1, wherein the intermediate fixing means include at least one bearing plane designed to be placed against a face of the element and a concave shape designed to receive a complementary convex edge surface of the element.

4. A system according to claim 1, wherein the structure includes at least one positioning surface including a bearing strip designed to be substantially parallel to a face of the other member and a sealing surface including an elastically deformable lip designed to be placed against the member.

5. A system according to claim 1, wherein the structure is provided with at least one flush stud and the orifice of the stud opens out in the insertion direction, at least at the positioning surface, and the expansion space is exclusively defined by the outline of the stud perpendicularly to the insertion direction.

6. A system according to claim 1, wherein the structure is provided with at least one stud projecting from a positioning surface, and being separated by the expansion space, with the outline of the stud being designed to be subjected to outward elastic deformation, thereby forming a positioning surface portion for clamping and sealing between and end wall of the expansion space and the recess in the clamping position.

7. A system according to claim 1, wherein the expansion space has an end wall substantially perpendicular to the insertion direction, and wherein at least one stud is frustoconical in shape having a diameter of larger length close to the end wall of the expansion space than at its opposite end in the insertion direction where the orifice opens out, the frustoconical shape being designed to increase in flare angle during the predetermined outward elastic deformation.

8. A system according to claim 1, wherein at least one orifice is provided in a cylindrical housing that is substantially rectilinear longitudinally parallel to the insertion direction, the housing having no undercutting and including, in the insertion direction, a through opening so that a shank of the separate fastener means, when in the clamping position, has its free end at a distance from an end wall.

9. A system according to claim 1, including separate screw fastener means, each screw having a shank designed to be held captive in a housing in the insertion direction, the thread having a profile in parallel section that is in the form of a rounded chamfer having, going from its insertion free end towards its opposite end:

a thread leading edge sloping outwards substantially at 45°;

a junction between edges having a radius of the offer of 0.2 times to 0.3 times the diameter of the thread and of the order of 0.25 times said diameter and greater than 2 mm; and a thread retaining edge sloping inwards substantially at 15° to a transverse plane.

10. A method of assembling at least one other member to an element via an intermediate structure including a separable fastener system, wherein the method comprises, in combination, the following steps:

providing a structure of elastically deformable material having an intermediate fixing means carried by the structure for fixing the structure securely to the element and having at least one positioning surface on the structure for engaging the other member;

providing a stud formed integrally with the structure at the positioning surface, the stud being designed to be inserted through an aperture in the said other member, said stud having an orifice extending in an insertion direction through a cylindrical housing of the stud of substantially circular cross-section and extending substantially rectilinearly along the insertion direction, said housing being designed to capture a shank of a separate fastener means, said stud adapted to have a shank inserted therein and be subjected to predetermined outwards elastic deformation into an expansion space without destroying the orifice;

providing an expansion space around said stud;

providing a shank having a rounded chamfer thread of a diameter that is at least as great as that of the housing;

inserting a shank of separate fastener means in an insertion direction into a stud of the system using force and screwing motion;

subjecting the stud under the effect of the insertion force to predetermined outwards elastic deformation without injuring the orifice;

under the effect of the deformation into the expansion space, pressing the stud against the inside of a recess; and subjecting a frustoconical stud to an increase in its flare angle during predetermined outward elastic deformation;

while the orifice includes an end gap or opening, the shank in the final clamping position having its free end at a distance from an end wall or a through opening in the insertion direction.

11. A system according to claim 10, wherein the outline of the stud is subjected to deformation radially outwards, thereby forming a portion of the positioning surface for clamping, between an end wall of the expansion space and the recess.

* * * * *